United States Patent [19]

Zappia

[11] 4,081,073
[45] Mar. 28, 1978

[54] APPARATUS FOR TRANSFERRING PARTS
[75] Inventor: Anthony T. Zappia, Carmel, Ind.
[73] Assignee: Powers Manufacturing, Inc., Elmira, N.Y.
[21] Appl. No.: 691,493
[22] Filed: Jun. 1, 1976
[51] Int. Cl.² .............................................. B65G 47/82
[52] U.S. Cl. ..................................... 198/430; 198/740
[58] Field of Search ............... 198/430, 427, 429, 464, 198/487, 739, 740

[56] References Cited
U.S. PATENT DOCUMENTS

| | | | |
|---|---|---|---|
| 1,502,019 | 7/1924 | Clear et al. | 198/427 |
| 2,203,385 | 6/1940 | Figel | 198/430 |
| 2,547,791 | 4/1951 | Smith et al. | 198/430 |
| 2,805,638 | 9/1957 | Morin | 198/740 |
| 3,013,647 | 12/1961 | Gilbert | 198/429 |
| 3,040,867 | 6/1962 | Posten et al. | 198/430 |
| 3,184,031 | 5/1965 | Dunlap | 198/430 |
| 3,333,674 | 8/1967 | Homan | 198/487 |
| 3,687,262 | 8/1972 | Campbell et al. | 198/430 |
| 3,853,213 | 12/1974 | Lehman et al. | 198/429 |
| 3,994,387 | 11/1976 | Zappia | 198/430 |

Primary Examiner—Evon C. Blunk
Assistant Examiner—Richard K. Thomson

Attorney, Agent, or Firm—Seidel, Gonda & Goldhammer

[57] ABSTRACT

Apparatus for transferring parts moving serially along a first conveyor to parallel ranks on a second conveyor comprising a push bar for contacting and transferring the parts, a carriage for supporting the bar and a base for movably supporting the carriage. A first drive apparatus moves the bar from a starting position adjacent the first conveyor toward the second conveyor. A lifting apparatus raises the bar after the articles have been transferred from the first conveyor onto the second conveyor and maintains the bar in a raised position for at least a portion of its return to its starting position. The bar is mounted on a movable mounting apparatus so that the bar can move with respect to the carriage. A second drive apparatus is provided for moving the bar with respect to the carriage, the second drive apparatus including at least one drive arm for moving the bar mounting apparatus. The drive arm has a proximal end pivotally mounted on the carriage for movement about a vertical axis and a distal end pivotally connected to the movable mounting apparatus. The second drive apparatus further includes a portion for driving the drive arm pivotally on the carriage and for moving the carriage relative to the base.

16 Claims, 6 Drawing Figures

APPARATUS FOR TRANSFERRING PARTS

This invention relates to apparatus for transferring parts moving in a first direction along a first conveyor to a second conveyor to move such parts in a second direction. This invention is especially useful as a lehr loader to transfer items of ware which are being conveyed from a ware-forming machine on a first conveyor onto a lehr apron, the lehr apron being the second conveyor.

There are several types of apparatus for delivering articles, e.g., glass bottles or other frangible items of ware, from a first conveyor moving the items in a first direction, to a second conveyor, e.g., a lehr apron, to move the articles in a second direction, which may be, for example, perpendicular to the first direction. The following list of patents, though not exhaustive, is presented as illustrative of the different types of devices which have been developed to transfer items of ware from a first conveyor onto the apron of an annealing lehr.

| Inventor | Pat. No. | Issue Date |
| --- | --- | --- |
| Moorshead | 861,383 | 7/30/07 |
| McDermott | 1,558,691 | 10/27/25 |
| Hall | 1,853,417 | 4/12/32 |
| Freese | 1,883,362 | 10/18/32 |
| Hutchinson | 1,906,605 | 5/02/33 |
| Beeson et al | 1,983,593 | 12/11/34 |
| Link et al | 2,252,937 | 8/19/41 |
| McNamara et al | 2,390,725 | 12/11/45 |
| Herrold | 2,407,664 | 9/17/46 |
| Brandenberger | 2,781,121 | 2/12/57 |
| Posten et al | 3,040,867 | 6/26/62 |
| Lefever | 3,196,811 | 7/27/65 |
| Zappia et al | 3,244,266 | 4/05/66 |
| Bowman | 3,765,856 | 10/16/73 |
| Lehman et al | 3,853,213 | 12/10/74 |
| Kulig et al | 3,826,381 | 7/30/74 |

Particular attention is directed to the Lehman et al patent and to my prior co-pending U.S. Pat. applications Ser. No. 564,102 and Ser. No. 564,103, both filed Apr. 1, 1975, titled, respectively, Twin Drive Push Bar Stacker, and Double Arm Push Bar Stacker, both of which applications are assigned to Ball Brothers Service Corporation.

The present invention constitutes an improvement upon the devices illustrated in these prior art patents and patent applications. Particularly, the present invention includes improved means for shifting a push bar of such a lehr loader longitudinally of a first conveyor as the push bar urges the items of ware generally transversely of the first conveyor onto the lehr apron. The present invention also comprises improved means for raising the push bar after it has transferred the items of ware from the first conveyor onto the lehr apron, and for maintaining the push bar in a raised position for a predetermined portion of its return stroke. It is an object of the present invention to provide a lehr loader which can work easily at relatively high loading rates, e.g., thirty or more strokes per minute, by the push bar.

In accordance with the invention, an apparatus for transferring parts moving along a first conveyor to a second conveyor includes a push bar for contacting and transferring the parts, a carriage for supporting the push bar and a base for movably supporting the carriage. First drive means moves the bar from a starting position adjacent the first conveyor toward the second conveyor. Means are also provided for raising the bar after it has transferred the articles from the first conveyor onto the second conveyor and for maintaining the bar in a raised position for a portion of its return stroke. Means are provided for movably mounting the bar with respect to the carriage, and second drive means moves the bar and carriage with respect to one another. The second drive means comprises at least one drive arm for moving the bar mounting means, the drive arm being pivotally coupled to the bar mounting means and to the carriage. The second drive means further comprises means for driving the drive arm pivotally upon the carriage and the carriage and base relative to one another.

In a preferred embodiment of the present invention, the second drive means comprises a rack mounted on the base and a pinion gear mounted on the carriage and engaging the rack. The pinion gear has a vertical axis of rotation and is coupled to the drive arm to drive it pivotally, thereby driving the bar mounting means in an arc as the carriage moves with respect to the base.

Further in accordance with the present invention, the second drive means also comprises at least one idler arm which aids in supporting the bar mounting means. The idler arm is also pivotally coupled to the bar mounting means and to the carriage to move in an arc as the drive arm moves in an arc. In the disclosed embodiment, the arcs described by the drive arm and idler arm are identical.

An object of the present invention is to provide a lehr loader including a push bar and a base. The bar is movably mounted on the base by a frame. First means are provided for driving the frame through a closed path on the base. The first drive means includes a crank and connecting rod. The crank is journal mounted for rotation on the base and the connecting rod has a first end connected to the crank. The frame comprises a first frame portion for movement in a plane horizontal path and a second frame portion to which the bar is attached. The second frame portion is pivotally attached to the first about an axis. Means are provided for pivoting the second frame portion about this axis, thereby causing the second frame portion to elevate the bar at the point at which the bar is adjacent the lehr apron. The bar remains elevated for part of the return stroke to avoid interference with ware conveyed along the first conveyor subsequent to the engagement of the bar with ware to be conveyed onto the apron. The bar lifting means comprises a flexible cable and a plurality of guide means about which the cable is trained. The cable has a first end anchored to the first frame portion and a second end anchored to the second frame portion. The connecting rod is pivotally connected intermediate its first and second ends to the first frame member. One of the guide means is disposed at the second end of the connecting rod and an intermediate portion of the flexible cable is trained thereabout. Movement of the second end of the connecting rod at the end of the forward stroke about its pivotal engagement to the first portion causes tension on the cable and lifting of the bar.

The invention may best be understood by referring to the following description and accompanying drawings which illustrate an embodiment of the invention. In the drawings.

Figure 1:
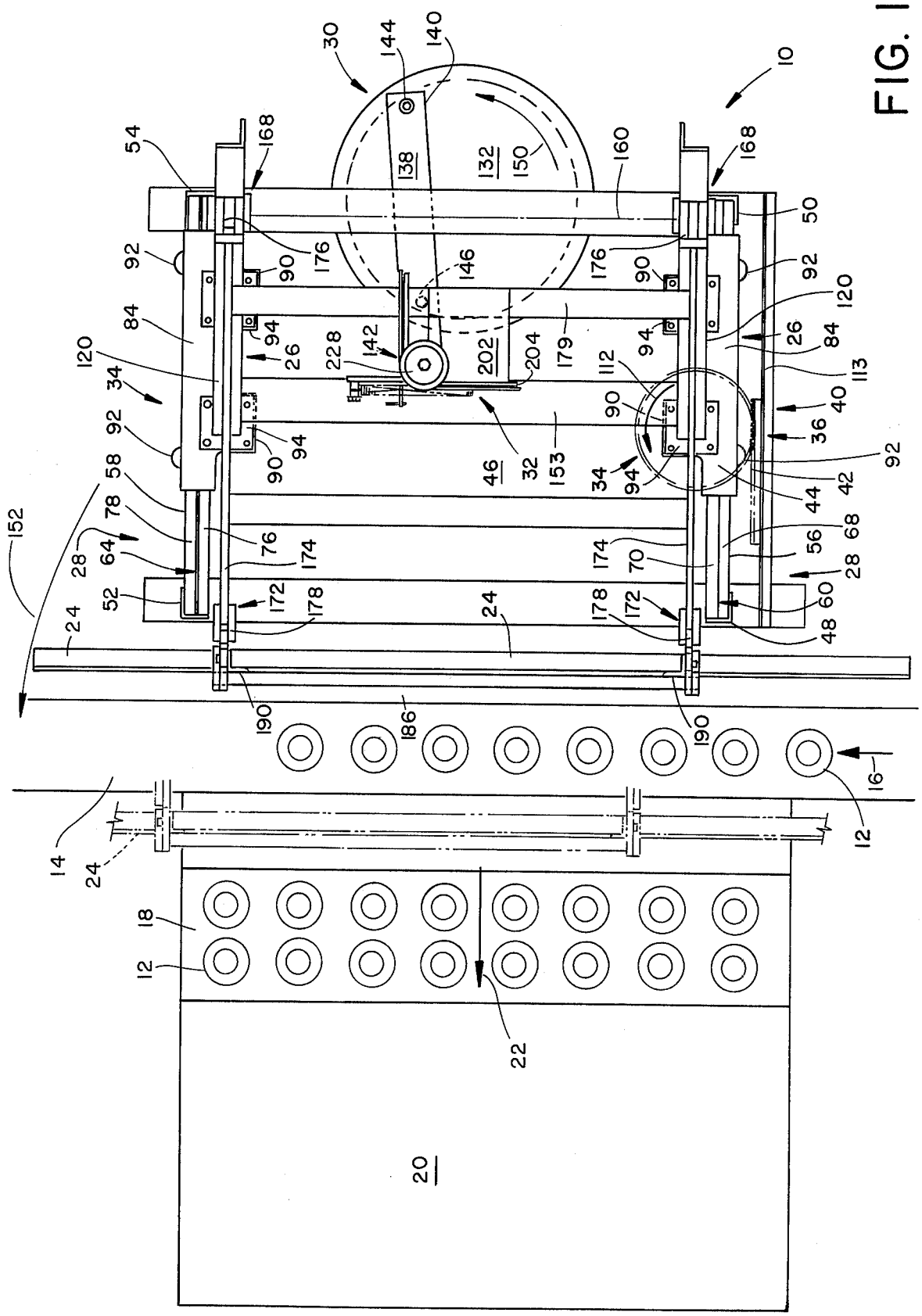
FIG. 1 is a top plan view of an apparatus constructed in accordance with the present invention in which there are illustrated diagrammatically portions of a first conveyor and a lehr apron.
Figure 2:
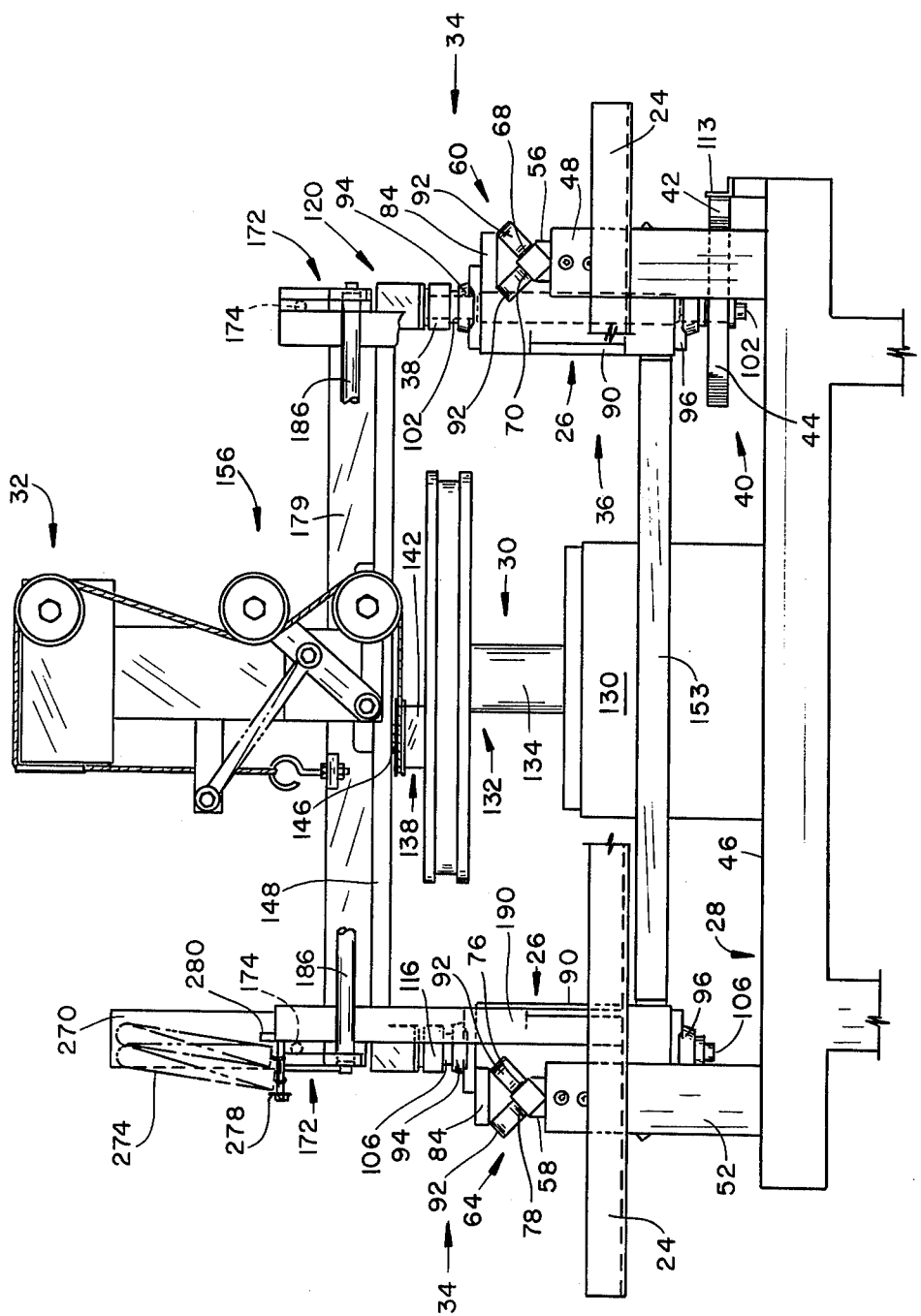
FIG. 2 is a front elevational view of the apparatus of FIG. 1.

Referring now particularly to FIG. 1, there is an apparatus 10, illustratively, a lehr loader, for transferring items of ware 12, e.g., newly formed glass bottles, from a first conveyor 14 moving in a first direction (the direction of arrow 16) to a second conveyor 18, illustratively, the apron of an annealing lehr 20, moving in a second direction, the direction of arrow 22.

Apparatus 10 comprises a push bar 24 for contacting and transferring the items 12, a carriage 26 for supporting the bar, and a base 28 for movably supporting the carriage. First drive means 30 moves the bar 24 from a starting position (illustrated in solid lines) adjacent first conveyor 14 through a forward stroke terminating adjacent lehr apron 18 (the position illustrated in broken lines in FIG. 1). Means 32 are provided for raising the bar 24 after it has transferred items 12 onto lehr apron 18 and for maintaining bar 24 in a raised position for at least a portion of its return stroke to the position illustrated in solid lines in FIG. 1. Means 34 are provided for movably mounting bar 24 with respect to the carriage 26. Second drive means 36 include at least one drive arm 38 (FIG. 4) for movably mounting means 34 on carriage 26, and means 40, illustratively a rack 42 and a pinion gear 44, for driving drive arm 38 pivotally upon carriage 26 and for moving carriage 26 with respect to base 28.

Referring now to FIGS. 2-4 and 6, base 28 includes a table 46 upon which are mounted four upstanding corner supports 48, 50, 52, 54. Between supports 48, 50, a block 56 is mounted. A block 58 is mounted between supports 52, 54. The top 60 and bottom 62 edges respectively of block 56 and the top 64 and bottom 66 edges, respectively, of block 58 are formed to provide four pairs of tracks 68-70, 72-74, 76-78, and 80-82.

Tracks 68-70 and 72-74 support a carriage 26. Another carriage 26 is supported upon tracks 76-78 and 80-82. Each carriage 26 comprises a member 84 supported from top edge 60, 64 of blocks 56, 58, respectively, and a member 88 supported from the bottom edge 62, 66 of block 56, 58 respectively. Memebers 84, 88 are disposed freely to move on tracks 68-82 upon bearing-mounted rollers 92. In the illustrated embodiment, rollers 92 are staggered in their locations along each pair of tracks (see rollers 92 on tracks 68-70 in FIG. 6). The actual locations and number of rollers 92 can vary with the requirements of a particular application.

Members 84, 88 of each carriage 26 are connected together by two blocks 90. Blocks 90 have bearing retainers 94, 96 attached to their upper and lower ends, respectively.

Second drive means 36 includes shafts 102, 104, 106, 108 which extend vertically through blocks 90 and are supported for free rotation upon bearings (not shown) in retainers 94, 96. Drive arm 38 is mounted at the upper end of shaft 102. Drive arm 38 is securely attached, e.g., by a key or set screw, to shaft 102 and is driven by rotation of the shaft. Pinion gear 44 is secured, e.g., by a key or set screw, to the lower end of shaft 102. Rack 42 is mounted upon an angle bracket 113 on base 28 so that pinion gear 44 engages rack 42. When carriage 26 moves with respect to base 28, drive arm 38 is driven pivotally with shaft 102, the distal end 115 of arm 38 describing an arc 112 (FIG. 1). Idler arms 114, 116, 118 are supported for rotation by bearings (not shown) in bearing retainers 94, 96 of the remaining blocks 90. These idler arms 114, 116, 118 aid in supporting means 34 which movably supports bar 24 with respect to carriage 26.

Bar support means 34 includes a first frame portion 120 which is pivotally coupled to distal end 115 of drive arm 38 and to the distal ends 124, 126, 128 of idler arms 114, 116, 118, respectively. In the illustrated embodiment, arms 114, 116, 118 are the same length as drive arm 38 and the distal ends 124, 126, 128 of these idler arms are connected to the first frame portion 120. Idler arms 114, 116, 118 are thereby constrained to describe arcs identical to arc 112 (FIG. 1) in the horizontal plane. First frame portion 120 moves in an arc identical to arc 112 of arm 38. Arms 38, 114, 116, 118 together support first frame portion 120 and move it through arc 112 on carriage 26 as bar 24 is urged toward lehr 20 by the first drive means 30.

First drive means 30 comprises a prime mover 128, a transmission 130 and a crank member 132 supported on a vertically extending crank shaft 134 journaled in base 28 for rotation. First drive means 30 further includes a connecting rod 138 having first and second ends 140, 142, respectively. First end 140 is pivotally connected about a vertically extending axis at 144 (FIG. 1) to crank member 132. Connecting rod 138 is further pivotally connected intermediate first and second ends 140, 142, respectively, about a vertical axis at 146 (FIG. 2) to the underside of a cross member 148 of frame portion 120. Rotation of crank member 132 in the direction of arrow 150 (see FIGS. 1, 6) causes first frame portion 120 to move bar 24 through arc 112 (FIG. 1) with respect to carriages 26 as carriages 26 move with respect to base 28. The motion of bar 24 is first to advance items 12 from first conveyor 14 onto lehr apron 18, as indicated by arrow 152 in FIG. 1. The path traced by bar 24 during its forward stroke is dictated by rotation of crank member 132, pivotal connection 146 of rod 138 to first frame portion 120 and the pivotal connection of drive arm 38 and idler arms 114-118 to carriages 26 and first frame member 120. As used herein, the term "forward stroke" describes a portion of the rotation of crank 132 and the resulting motion of bar 24 from its position illustrated in solid lines in FIG. 1 toward its position illustrated in broken lines. The term "return stroke" describes motion of crank 132 which results in motion of bar 24 from its position illustrated in broken lines in FIG. 1 to its position illustrated in solid lines.

It must here be noted that the apparatus 10 can include, at the option of the user and as need dictates, additional drive arms similar to drive arm 38. One or more of idler arms 114, 116, 118 can be converted to drive arms by equipping one or more of shafts 104, 106, 108 with pinion gears similar to gear 44 and locating on base 28 one or more corresponding racks similar to rack 42.

It must also be here noted that carriages 26 can be employed individually rather than in pairs as illustrated in the embodiment of the Figs. In situations in which one of carriages 26 is employed individually, such a carriage 26 must have a drive arm 38 supported upon a drive shaft 102 and driven by a pinion gear 44 from a rack 42 mounted upon base 28. The addition to this basic configuration of one or more idler arms such as idler arms 114, 116. 118 of the present embodiment may be as required by the needs of a particular application. It should be noted that in the embodiment here presented, a cross member 153 (FIGS. 1, 2, 4 and 6) is employed to connect the carriages 26 to one another.

A second frame member 156 is mounted on the first frame member 120 for pivotal movement about a horizontally extending axis 160 (FIGS. 1 and 6) with respect thereto. Second frame member 156 comprises a pair of arms 162, each having a proximal end 164. Proximal ends 164 are pivotally mounted at 165 by brackets 168 which extend vertically from first frame member 120. Arms 162 are pivotally coupled at their distal ends 170 to vertically extending brackets 172. A pair of rods 174 extend parallel to arms 162 and are pivotally coupled at their proximal and distal ends 176, 178, respectively, to brackets 168, 172. The parallelograms formed by arms 162, brackets 168, 172, and rods 174 insure that brackets 172 are always vertical regardless of the orientation of arms 162. Arms 162 are rigidly connected together by a cross member 179. Cross member 179 is located directly above cross member 148.

Figure 3:
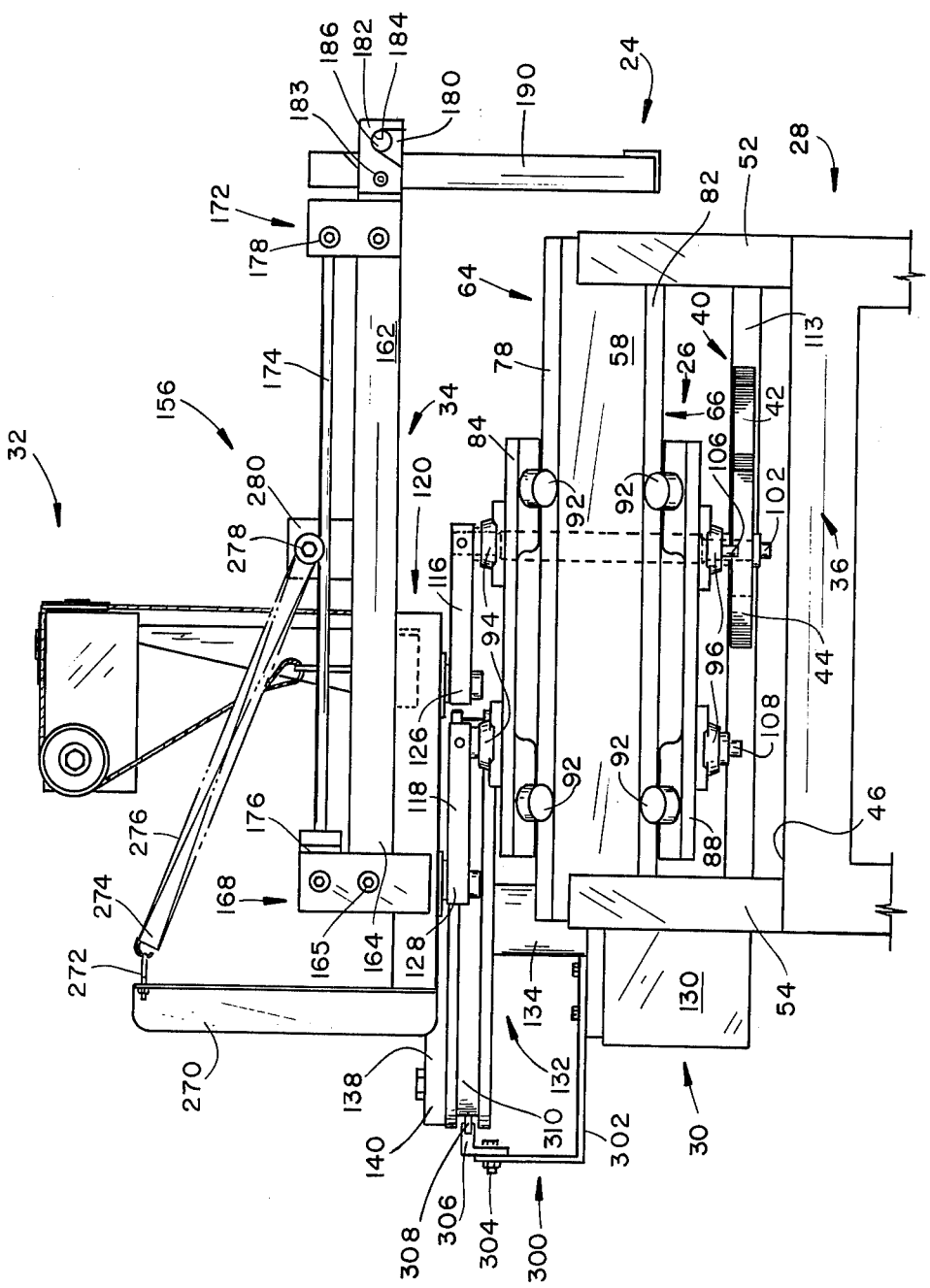
FIG. 3 is a side elevational view of the apparatus of FIGS. 1-2.
Figure 4:
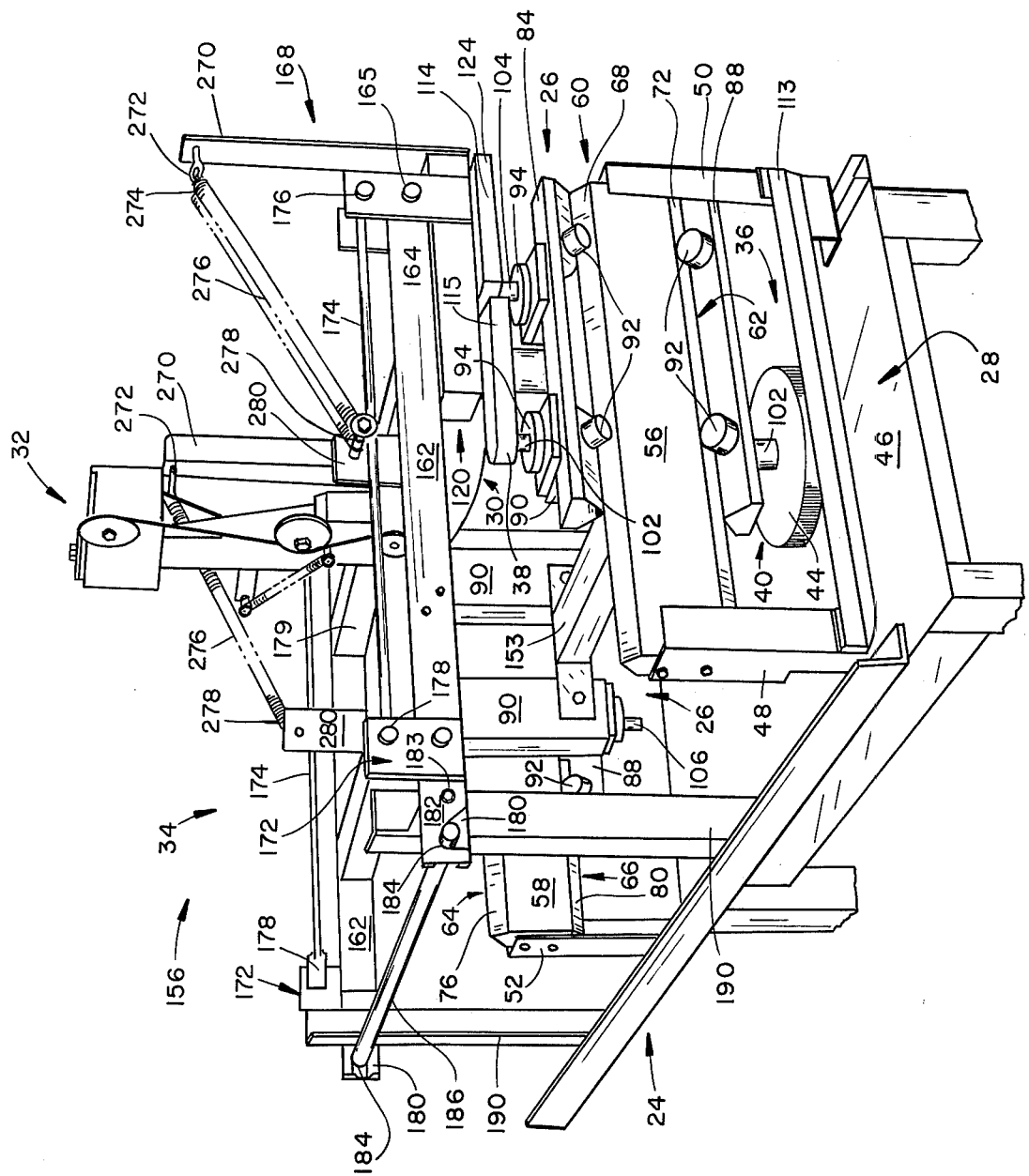
FIG. 4 is a perspective view of the apparatus of FIGS. 1-3.

Extending forward from, and perpendicular to, each of brackets 172 is carrier bracket 180 (FIGS. 3-4). Brackets 180 include retainers 182 pivotally mounted at points 183 thereto. Brackets 180 and retainers 182 define circular apertures 184 which accommodate a rod 186. Rod 186 is thus supported and retained at the distal end of second frame member 156. Rod 186 carries two depending legs 190 to which push bar 24 is attached. Rod 186 is rotatable in apertures 184 so that if bar 24 encounters substantial resistance during either its forward stroke (to move items 12 onto lehr apron 18) or its return stroke (returning to the position illustrated in solid lines in FIG. 1), rod 186 will pivot readily, preventing damage to bar 24, frame members 120, 156, and drive means 30, 36.

At the end of the forward stroke of bar 24, when the apparatus is in the position illustrated in broken lines in FIG. 1, it is desirable to lift bar 24. Bar 24 must be lifted to prevent it from interferring with items 12 moving along conveyor 14 after engagement by bar 24 of a rank of items 12 and movement of such engaged items onto apron 18. To this end, the pivotal connections 165 have been provided. Further, means 32 is provided for raising bar 24 after the bar has engaged items 12 and transferred those items from conveyor 14 to lehr apron 18. Means 32 then maintains bar 24 in a sufficiently elevated orientation to clear ware on conveyor 14 until bar 24 has passed conveyor 14 on its return stroke.

Figure 5:
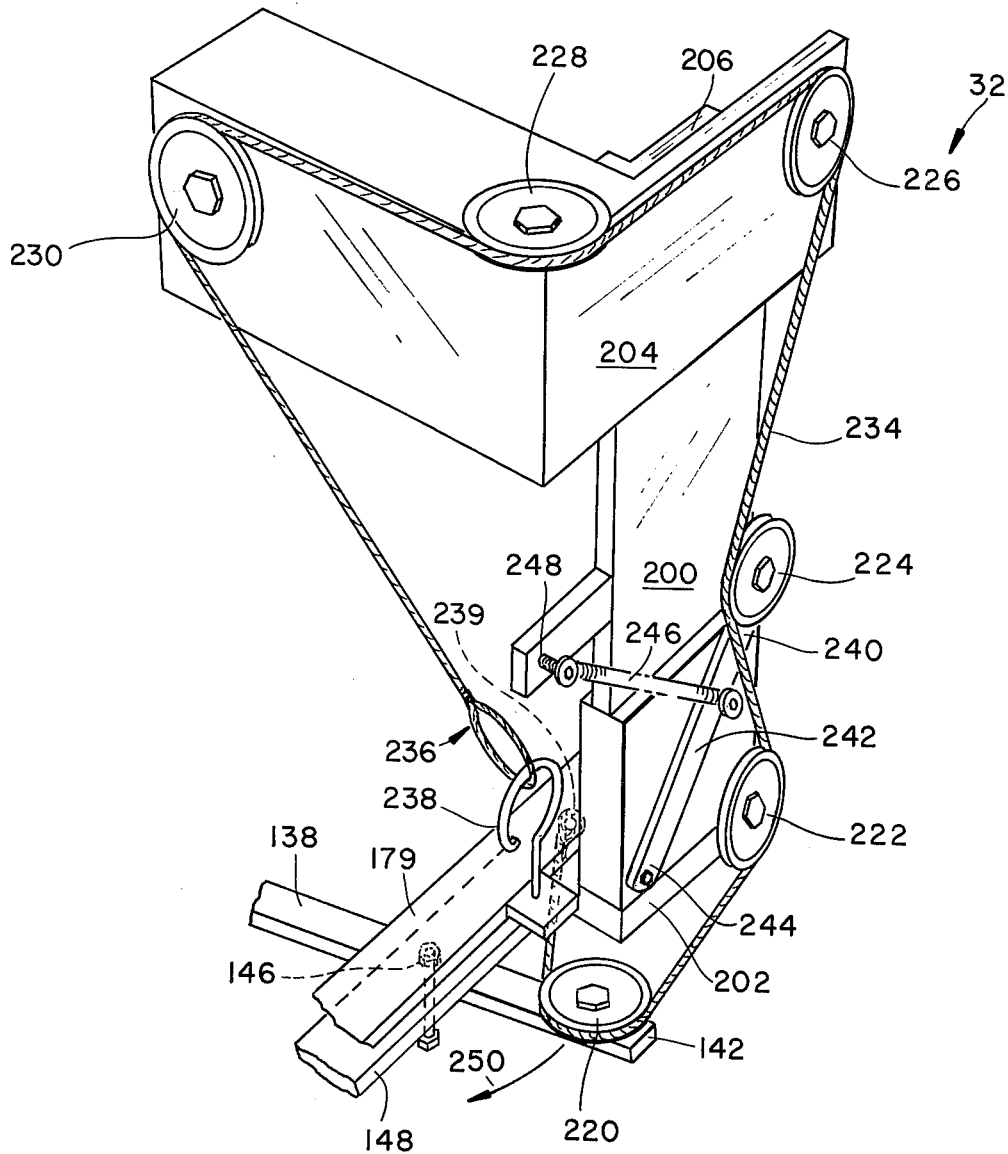
FIG. 5 is a perspective view of a detail of the apparatus of FIGS. 1-4.

Means 32, as best illustrated in detail in FIG. 5, comprises an upstanding bracket 200 secured at its foot 202, e.g., by welding, to cross member 148 of first frame portion 120. Lifting means 32 includes a plurality of guide means 220, 222, 224, 226, 228, 230. Guide means 220-230 in the illustrated embodiment are pulleys mounted for rotation upon their respective shafts. Pulley 220 is rotatably mounted on the second or distal end 142 of connecting rod 138. The remaining pulleys 222-230 are mounted on their respective shafts on brackets 200, 204. Lifting means 32 further includes flexible means, illustratively a cable 234, having a first end 236 anchored by a hook 238 to cross member 179. Cable 234 is trained about pulleys 220-230. The remaining end 239 of cable 234 is connected to the underside of cross member 148. Pulley 224 is mounted upon one end 240 of an idler arm 242, the remaining end 244 of which is pivotally connected to bracket 200. Idler arm 242 is urged about its pivotal connection to bracket 200 in such a direction as to increase the tension on cable 234 by a spring 246 connected between arm 242 and a point 248 on bracket 200.

In operation of lifting means 32 of the illustrated lehr loader 10, end 142 of connecting rod 138 moves rapidly in the direction indicated by arrow 250 in FIG. 5 at the beginning of the return stroke of bar 24. This movement increases the tension of cable 234. Since end 236 of cable 234 is connected by hook 238 to cross bar 179 and since cross bar 179 is connected to arms 162 which are pivotally connected to first frame portion 120, the increased tension on cable 234 causes second frame portion 156 to be raised quickly from first frame portion 120 at the beginning of the return stroke. During the return stroke, as crank member 132 of FIGS. 1-4, 6 continues to rotate in the direction of arrow 150, second end 142 of rod 138 moves in the direction opposite arrow 250 of FIG. 5, decreasing the tension on cable 134 and allowing second frame member 156 to return to rest in overlying relationship with first frame portion 120.

Figure 6:
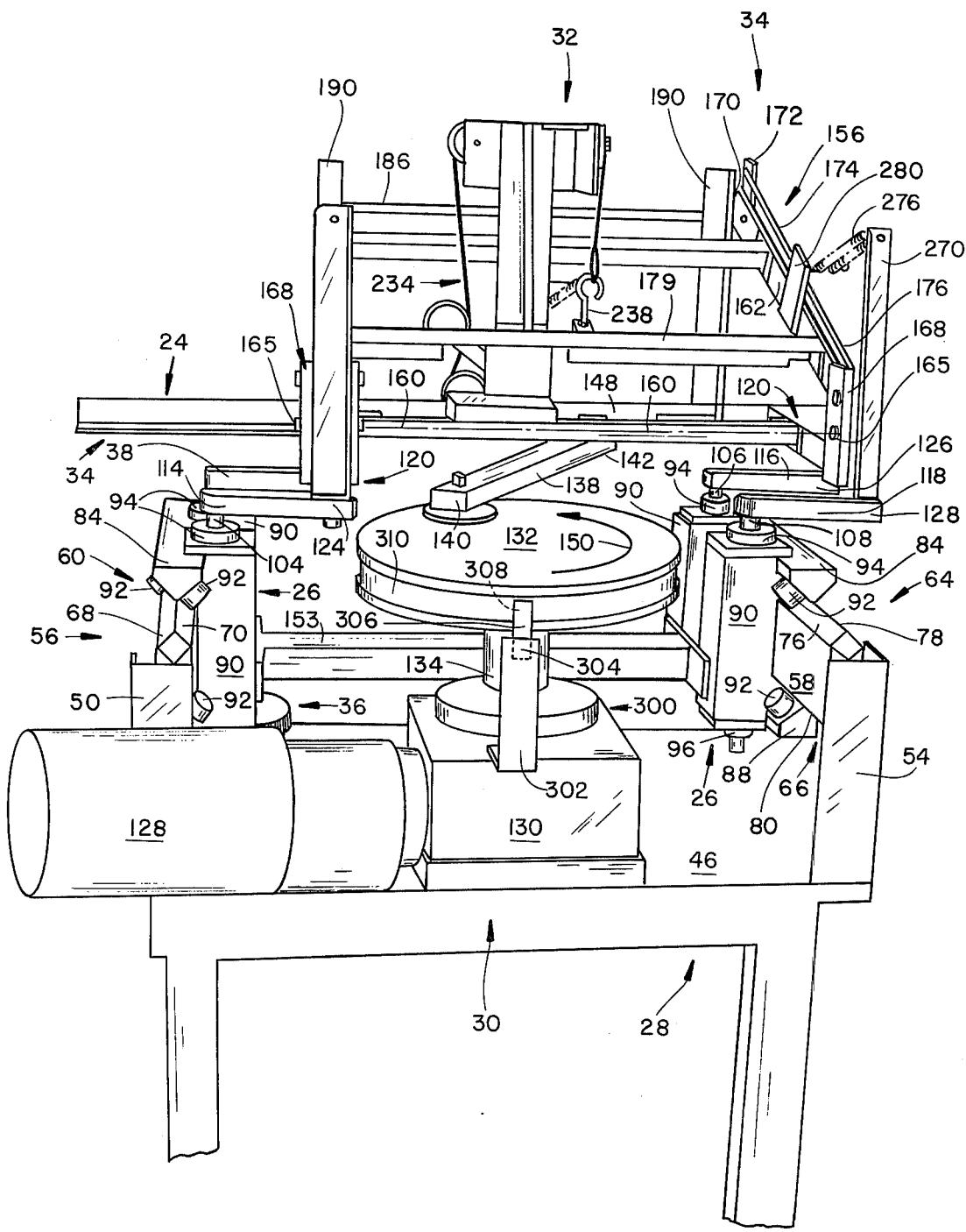
FIG. 6 is a rear perspective view of the apparatus of FIGS. 1-4.

As best illustrated in FIGS. 3-4, first frame portion 120 further includes, at the rearward extent thereof, a pair of upstanding brackets 270. Attached to the top of each of brackets 270 is a hook 272. Each hook 272 serves to retain ends 274 of a pair of biasing springs 276. The remaining ends 278 of biasing springs 276 are attached to brackets 280. Brackets 280 are attached, as by welding, to arms 162 intermediate the proximal and distal ends of such arms. Springs 276 urge arms 162 to move bar 24 upwardly. Springs 276 thus aid lifting means 32 to raise bar 24 at the beginning of the return stroke, as best illustrated in FIG. 6.

First drive means 30 further includes, in the illustrated embodiment, means 300 (FIGS. 3 and 6) for stopping the motion of bar 24 at one or more desired positions. Means 300 includes a bracket 302 mounted on top of transmission 130. Attached to the distal end 304 of bracket 302 is a cam sctuated switch 306. A follower 308 of switch 306 rides in a peripherally and axially extending cam groove 310 of crank 132. Cam groove 310 is provided so that during each revolution of crank 132, crank 132, and bar 24 which is driven thereby, can be stopped at one or more desired positions. To stop crank 132, switch 306 is connected to circuit means (not shown) for controlling prime mover 128. Such circuit means can include, for example, a time delay or speed control circuit which will stop or slow revolution of crank 132 for a predetermined time at a predetermined location during each revolution of crank 132. In this manner, bar 24 may be stopped or slowed, for example, at the point at which it engages items 12 of ware on conveyor 14 to move such items onto lehr apron 18. Thus, the apparatus 10 can move bar 24 in a forward stroke to move items 12 onto the lehr apron at any desired speed and move through the return stroke at this speed until bar 24 is about to engage the next series of items 12 for transfer onto lehr apron 18. At this point, motion of bar 24 can be slowed sufficiently to prevent damage to items 12 until such items are engaged by the bar for transfer onto the lehr apron. Additional cam surfaces similar to cam surfaces 310 and control means similar to switch means 306 can be added about the periphery of crank 132 as the requirements of a particular application dictate.

It must be noted that in the disclosed embodiment, connecting rod 138 is connected to cross member 148 of first frame portion 120. Thus, the forward stroke of crank member 132 moves first frame portion 120, and bar 24, toward lehr 20. As can be appreciated, the rotation of drive arm 38 upon shaft 102 which results during the forward stroke of crank member 132 drives carriages 26 forward. The coupling of carriages 26 to base 28 through rack 42 and pinion 44 makes the forward and rearward reciprocation of carriages 26 uniform during each forward and return stroke, respectively, of bar 24. It must be appreciated, however, that connecting rod 138 could be attached to some portion of one of carriages 26. Connecting rod 138 could also be connected to cross member 153 which couples carriages 26 together. In such alternative embodiments of the present invention, the forward stroke of crank member 132 would move drive arm 38 pivotally with shaft 102 as carriage 26 moves with respect to base 28. Such motion would also result from the engagement of rack 42 and pinion 44 on the base 28 and carriage 26, respectively. Thus, it must be understood that the present invention contemplates either second drive means 36 which drives the bar mounting means 34 with respect to carriage 26 as carriage 26 moves with respect to base 28, or second drive means 36 which drives carriage 26 with respect to base 28 as bar mounting means 34 also moves with respect to base 28.

What is claimed is:

1. In an apparatus for transferring parts moving in a first direction along a first conveyor to a second conveyor to move such parts in a second direction along said second conveyor comprising a push bar for contacting and transferring the parts, a carriage for supporting the bar, a base for movably supporting the carriage, first drive means for moving the bar from a starting position adjacent the first conveyor toward the second conveyor, means for raising the bar after it has transferred the articles from the first conveyor onto the second conveyor and for maintaining the bar in a raised position for a portion of its operating cycle, means for movably mounting the bar with respect to the carriage, and second drive means for moving the bar with respect to the carriage, the improvement wherein the second drive means comprises at least one drive arm for moving the bar mounting means, the drive arm being pivotally coupled to the bar mounting means and to the carriage, and means for driving the drive arm pivotally and the carriage reciprocally relative to the base, said means for driving the drive arm comprising a rack fixedly mounted on the base and a pinion gear mounted on the carriage for reciprocal motion therewith, said pinion gear engaging the rack and having a vertical pivot axis, the pinion gear being coupled to the drive arm to drive it pivotally about said vertical axis whereby when said pinion gear rotates the bar mounting means pivots in an arc as the carriage reciprocates with respect to the base.

2. The improvement of claim 1 wherein the first drive means comprises a crank and a connecting rod, a prime mover for turning the crank on its axis, the crank being mounted on the base and the connecting rod being pivotally connected to the crank and to the bar mounting means to reciprocate the carriage with respect to the base, the bar mounting means being constrained to pivot in said arc by said drive arm, whereby the pivoting of said bar mounting means in said arc rotates said pinion and reciprocates said carriage with respect to said base.

3. The improvement of claim 1 wherein the first drive means comprises means for moving the bar mounting means toward and away from the second conveyor with respect to the base.

4. The improvement of claim 1 wherein the second drive means further comprises at least one idler arm for aiding in supporting the bar mounting means, the idler arm being pivotally coupled to the bar mounting means and to the carriage.

5. The improvement of claim 4 wherein the second drive means comprises two idler arms pivotally coupled to the bar mounting means and to the carriage.

6. Apparatus for transferring items of ware from a first conveyor to a lehr apron comprising a push bar for contacting and transferring the ware, a carriage for supporting the bar, a base for movably supporting the carriage, first drive means for moving the bar with respect to the base from a starting position in which the bar is adjacent the first conveyor to a position in which the bar is adjacent the lehr apron, for raising the bar to clear ware subsequently conveyed on the first conveyor, and for returning the bar to its starting position adjacent the first conveyor, means for movably mounting the bar with respect to the carriage, and second drive means for moving the bar mounting means with respect to the carriage, the second drive means comprising at least one drive arm pivotally coupled to the carriage and to the bar mounting means about vertically extending pivotal axes, and means for driving the drive arm pivotally with respect to the carriage as the carriage reciprocates with respect to the base, said means for driving the drive arm pivotally comprising a rack fixedly coupled to the base and a pinion gear rotatable about a generally vertical axis, said pinion gear being meshed with said rack and being coupled to the drive arm for rotation therewith and supported by the carriage for reciprocation therewith.

7. The apparatus of claim 6 wherein the first drive means comprises a crank and a connecting rod, the crank being journalled in the base for rotation about a vertically extending axis, and the connecting rod being pivotally coupled to the crank and to the bar mounting means to reciprocate the carriage with respect to the base.

8. The apparatus of claim 7 wherein said first drive means further includes a prime mover for turning the crank, and means for controlling the crank, the crank controlling means being mounted on the base for sensing the rotational position of the crank and for altering the rotation of the crank at at least one preselected rotational position thereby altering the motion of the bar mounting means at at least one preselected position.

9. The invention of claim 8 wherein the crank includes a cam surface and the crank controlling means comprises at least one switch for engaging the cam surface and for switching in response to rotation of the crank and movement of the cam surface relative to the switch, the switch controlling the prime mover to alter the rotation of the crank for a predetermined portion of each rotation of the crank at the preselected rotational position of the crank.

10. The invention of claim 9 wherein the crank is mounted for rotation about a vertical axis and the connecting rod is coupled to the crank and to the bar mounting means to pivot about vertical axes.

11. The apparatus of claim 6 and further comprising at least one idler arm for partially supporting the bar mounting means from the carriage, the idler arm being pivotally coupled to the carriage about an axis parallel to the pivotal axes of the drive arm.

12. A lehr loader comprising a push bar, a base, a pair of carriages movably supported on the base, first means for driving the bar with respect to the base, means for movably mounting the bar on the carriages, and second means for driving the bar mounting means with respect to the carriages, the bar mounting means comprising first and second frame portions, the second frame portion including a pair of arms, each arm having a proximal end and a distal end, one arm extending forward toward the lehr from the bar mounting means at each end of the bar, the proximal ends of the arms being movably coupled to the first frame portion and the bar being supported upon the distal ends, the second drive means comprising at least one drive arm for driving the bar mounting means with respect to the carriages, the drive arm being pivotally coupled to the first frame portion and to at least one of the carriages about parallel, vertically extending pivotal axes, the second drive means further comprising a rack fixedly coupled to the base and a pinion gear mounted on a common shaft with the drive arm, the pinion gear engaging the rack for revolution to move the said one of the carriages as the first drive means moves the bar with respect to the base.

13. The invention of claim 12 wherein there are two such drive arms, each coupled to one of the carriages and to the first frame portion.

14. The invention of claim 12 and further comprising at least one idler arm for aiding in supporting the bar mounting means upon the carriages, the idler arm being pivotally coupled to one of the carriages and to the first frame portion.

15. The invention of claim 14 wherein there are two such idler arms, one coupled to each of the carriages and to the first frame portion.

16. In an apparatus for transferring ware from a conveyor to a lehr, the conveyor conveying the ware generally transversely before the entry end of the lehr, comprising a push bar for engaging the ware to be transferred and pushing the ware onto the apron of the lehr, a frame for supporting the bar, a base for movably supporting the frame, a crank and connecting rod for moving the frame and bar in the direction of the entry end of the lehr, the crank being mounted for rotation on the base and the connecting rod having first and second ends and being connected at its first end to the crank, the improvement wherein the frame comprises a first frame portion for movement in a path from a starting point at which the bar is presented adjacent the conveyor through a forward stroke to a point at which the bar is adjacent the lehr apron, the connecting rod being coupled intermediate its first and second ends to the first frame portion, a second frame portion for carrying the bar, the second frame portion being pivotally coupled to the first, and means for pivoting the second frame portion on the first, causing the second frame portion to elevate the bar at the point at which the bar is adjacent the lehr apron, the bar remaining elevated for a portion of a return stroke to the starting point so that the bar will not interfere with ware on the conveyor during the return stroke, the bar lifting means comprising flexible means, a plurality of guide means for training the flexible means thereabout, the flexible means having a first end connected to the first frame portion and a second end connected to the second frame portion, one of said guide means being disposed at the second end of the connecting rod and having an intermediate portion of the flexible means trained thereabout, movement of the second end of the connecting rod at the end of the forward stroke about its pivotal engagement to the first frame portion causing tension of the flexible means to pivot the second frame portion on the first and lift the bar.

* * * * *